US011973297B2

(12) United States Patent
Chen et al.

(10) Patent No.: US 11,973,297 B2
(45) Date of Patent: Apr. 30, 2024

(54) ELECTRICAL CONNECTOR WITH SHIELDING FEATURES AND INSULATED HOUSING DESIGNED FOR STREAMLINED ASSEMBLING

(71) Applicant: Advanced Connectek Inc., New Taipei (TW)

(72) Inventors: Chingtien Chen, New Taipei (TW); Wei Wan, New Taipei (TW); Hua-Yan Wu, New Taipei (TW)

(73) Assignee: Advanced Connectek Inc., New Taipei (TW)

(*) Notice: Subject to any disclaimer, the term of this patent is extended or adjusted under 35 U.S.C. 154(b) by 62 days.

(21) Appl. No.: 17/684,430

(22) Filed: Mar. 2, 2022

(65) Prior Publication Data

US 2022/0285889 A1 Sep. 8, 2022

(30) Foreign Application Priority Data

Mar. 3, 2021 (CN) ......................... 202110236611.6

(51) Int. Cl.

| | |
|---|---|
| ***H01R 13/6586*** | (2011.01) |
| ***H01R 13/40*** | (2006.01) |
| ***H01R 13/46*** | (2006.01) |
| ***H01R 13/514*** | (2006.01) |
| *H01R 13/502* | (2006.01) |

(Continued)

(52) U.S. Cl.

CPC ......... *H01R 13/6586* (2013.01); *H01R 13/40* (2013.01); *H01R 13/46* (2013.01); *H01R 13/514* (2013.01); *H01R 13/502* (2013.01); *H01R 13/504* (2013.01); *H01R 13/648* (2013.01); *H01R 13/658* (2013.01); *H01R 13/6581* (2013.01); *H01R 24/60* (2013.01); *H01R 2201/06* (2013.01)

(58) Field of Classification Search

CPC .... H01R 13/6586; H01R 13/40; H01R 13/46; H01R 13/514; H01R 13/502; H01R 13/504; H01R 13/648; H01R 13/658; H01R 13/6581; H01R 24/60; H01R 2201/06

See application file for complete search history.

(56) References Cited

U.S. PATENT DOCUMENTS

2017/0194745 A1* 7/2017 Tsai .................. H01R 13/6594

FOREIGN PATENT DOCUMENTS

JP 3198932 U * 7/2015 ............. H01R 13/46
WO WO-2015181630 A2 * 12/2015 ......... H01R 12/7082

* cited by examiner

*Primary Examiner* — Abdullah A Riyami
*Assistant Examiner* — Justin M Kratt
(74) *Attorney, Agent, or Firm* — JCIPRNET

(57) ABSTRACT

An electrical connector including an insulating body, a first metallic member, a second metallic member, a plurality of terminals, and a metallic shell is provided. The insulating body has a base portion, a thickened step portion, and a tongue portion. The thickened step portion is located at a root of the base portion. The first metallic member and the second metallic member are disposed on an upper surface and a lower surface of the insulating body. The metallic shell is disposed on an exterior of the insulating body to surround the first metallic member, the second metallic member, and the terminals, wherein the front flat contact portion of each of the terminals is exposed out of the tongue portion, and a portion of the first metallic member and a portion of the second metallic member are exposed out of the thickened step portion.

17 Claims, 7 Drawing Sheets

(51) Int. Cl.

| | |
|---|---|
| *H01R 13/504* | (2006.01) |
| *H01R 13/648* | (2006.01) |
| *H01R 13/658* | (2011.01) |
| *H01R 13/6581* | (2011.01) |
| *H01R 24/60* | (2011.01) |

ELECTRICAL CONNECTOR WITH SHIELDING FEATURES AND INSULATED HOUSING DESIGNED FOR STREAMLINED ASSEMBLING

CROSS-REFERENCE TO RELATED APPLICATION

This application claims the priority benefit of China application serial no. 202110236611.6, filed on Mar. 3, 2021. The entirety of the above-mentioned patent application is hereby incorporated by reference herein and made a part of this specification.

BACKGROUND

Technical Field

The disclosure relates to an electrical connector.

Description of Related Art

Generally, an electrical connector insertion opening is universal serial bus (USB), which is widely used due to its relatively compact volume and portability and is common in connecting holes of various portable electronic devices, such as smart mobile communication devices and digital cameras, and disposed on and connected to corresponding transmission lines. However, with the miniaturization of electrical connectors, there may be difficulties in manufacturing due to the manufacturing process or the miniaturization of components, leading to a complex manufacturing process and an increasing manufacturing cost. In addition, an entire structural strength is likely to be compromised after the components are assembled.

Accordingly, how to properly adjust a structure of an electrical connector for the process issue above is an issue that relevant technicians need to consider.

SUMMARY

The disclosure provides an electrical connector with component arrangement properly adjusted to streamline an assembling process and increase a structural strength.

An electrical connector of the disclosure includes an insulating body, a first metallic member, a second metallic member, multiple terminals, and a metallic shell. The insulating body has a base portion, a thickened step portion, and a tongue portion, and the thickened step portion is located at a root of the tongue portion. The first metallic member and the second metallic member are disposed on an upper surface and a lower surface of the insulating body. The terminals are categorized into two terminal sets, and front flat contact portions of the two terminal sets are respectively disposed on an upper surface and a lower surface of the tongue portion. The metallic shell is disposed on an exterior of the insulating body to surround the first metallic member, the second metallic member, and each of the terminals. The front flat contact portion of each of the terminals is exposed out of the tongue portion, and a portion of the first metallic member and a portion of the second metallic member are exposed out of the thickened step portion.

An electrical connector comprising an insulating body, a first metallic member, a second metallic member, a plurality of terminals, a mid-plate, and a metallic shell is provided. The insulating body has a base portion, a thickened step portion, and a tongue portion, wherein the thickened step portion is located at a root of the tongue portion. The first metallic member and the second metallic member are respectively disposed on an upper surface and a lower surface of the thickened step portion. The terminals are categorized into two terminal sets, wherein front flat contact portions of the two terminal sets are respectively disposed on an upper surface and a lower surface of the tongue portion. The mid-plate disposed inside the insulating body and located between the two terminal sets, wherein the mid-plate is located between the first metallic member and the second metallic member. The metallic shell is disposed on an exterior of the insulating body to surround the first metallic member, the second metallic member, and the two terminal sets, wherein the insulating body comprises a first structure member, a second structure member and a third structure member, wherein the first structure member and the second structure member are respectively combined with the two terminal sets through insert molding to form two assemblies; after the two assemblies, the first metallic member, the second metallic member, and the mid-plate are correspondingly assembled, the mid-plate is disposed between the two assemblies, and the third structure member is combined with and encapsulates an exterior of the two assemblies, the first metallic member, the second metallic member, and the mid-plate through insert molding to form the insulating body such that the front flat contact portion of each of the terminals is exposed out of the tongue portion, and a portion of the first metallic member and a portion of the second metallic member are exposed out of the thickened step portion.

Based on the above, the insulating body of the electrical connector is divided into the base portion, the tongue portion, and the thickened step portion between the base portion and the tongue portion. The first EMI metallic member and the second EMI metallic member are disposed in the insulating body and the portions of the first EMI metallic member and the second EMI metallic member are respectively exposed out of the insulating body from the thickened step portion. Accordingly, in the disclosure, by inserting the portions of the two EMI metallic members into the insulating body, when a connection of the electrical connector and the other electrical connector is maintained, the portions exposed out of the insulating body still may achieve shielding or grounding with the other electrical connector. A conventional manufacturing process of an electrical connector where a molding process precedes an assembling process may be prevented, thereby avoiding difficulties in assembling due to component miniaturization. Furthermore, the entire structural strength of the insulating body may be enhanced.

DESCRIPTION OF THE EMBODIMENTS

Figure 1:
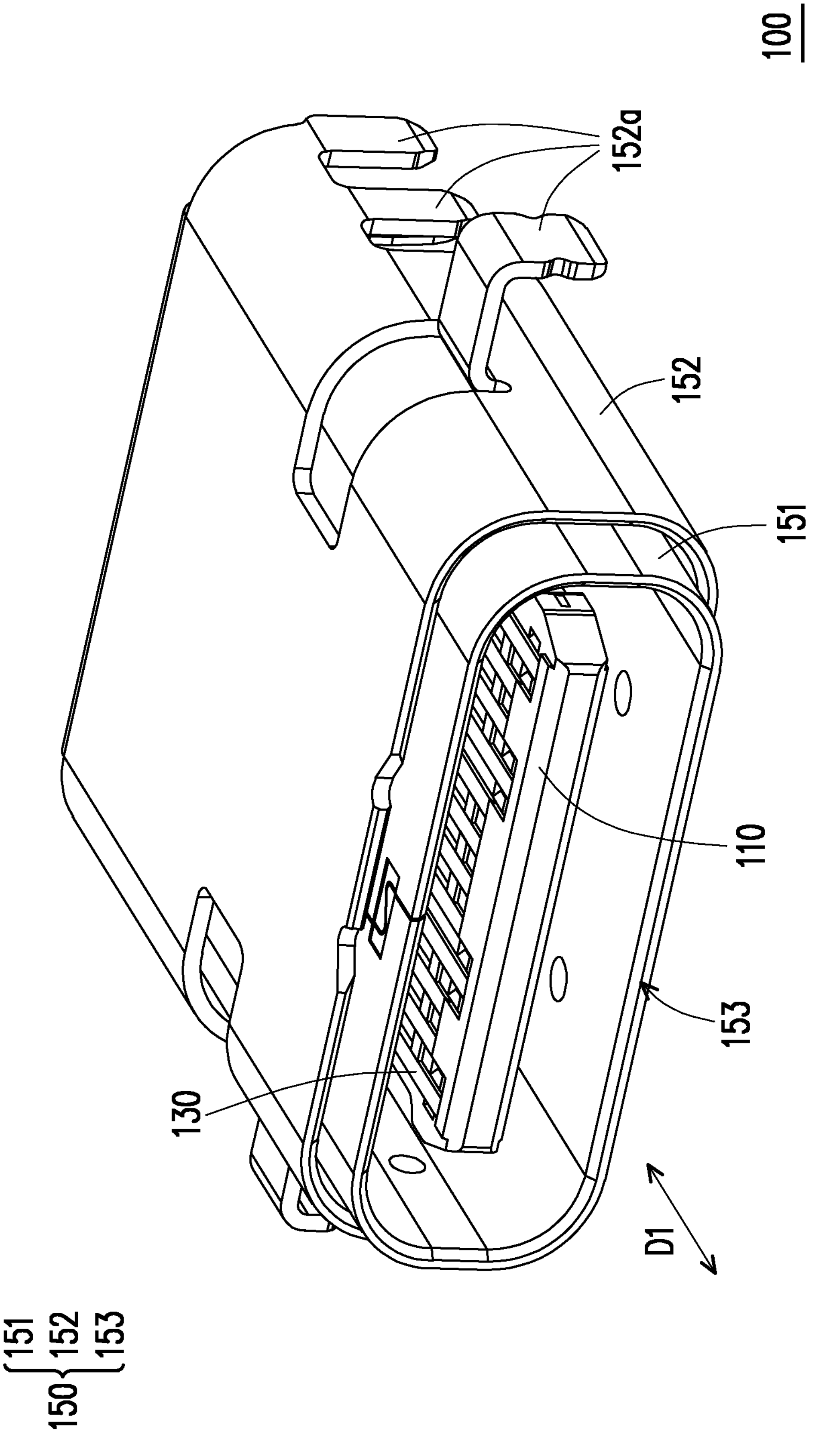
FIG. 1 is a schematic diagram of an electrical connector according to an embodiment of the disclosure.
Figure 2:
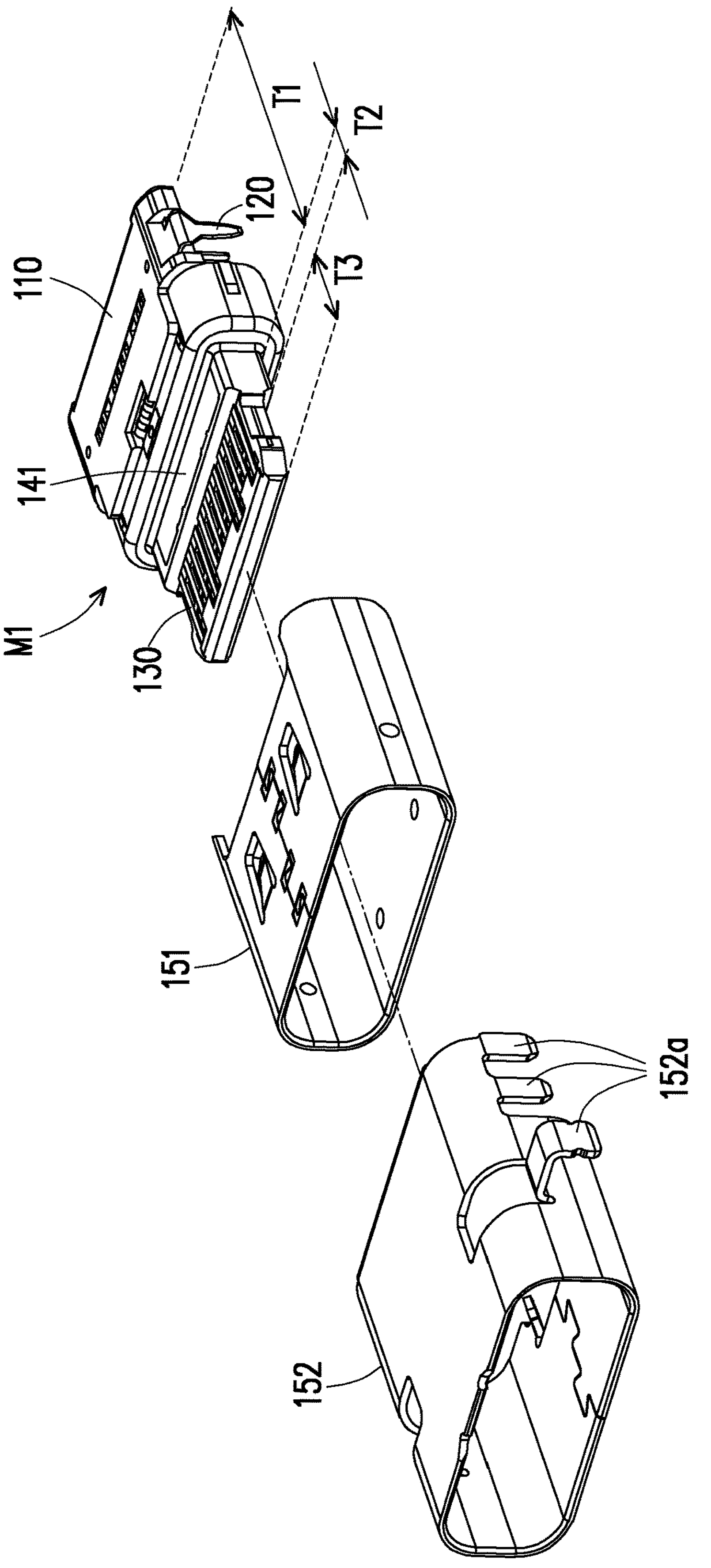
FIG. 2 is a schematic dissembled diagram of the electrical connector of FIG. 1.
Figure 3:
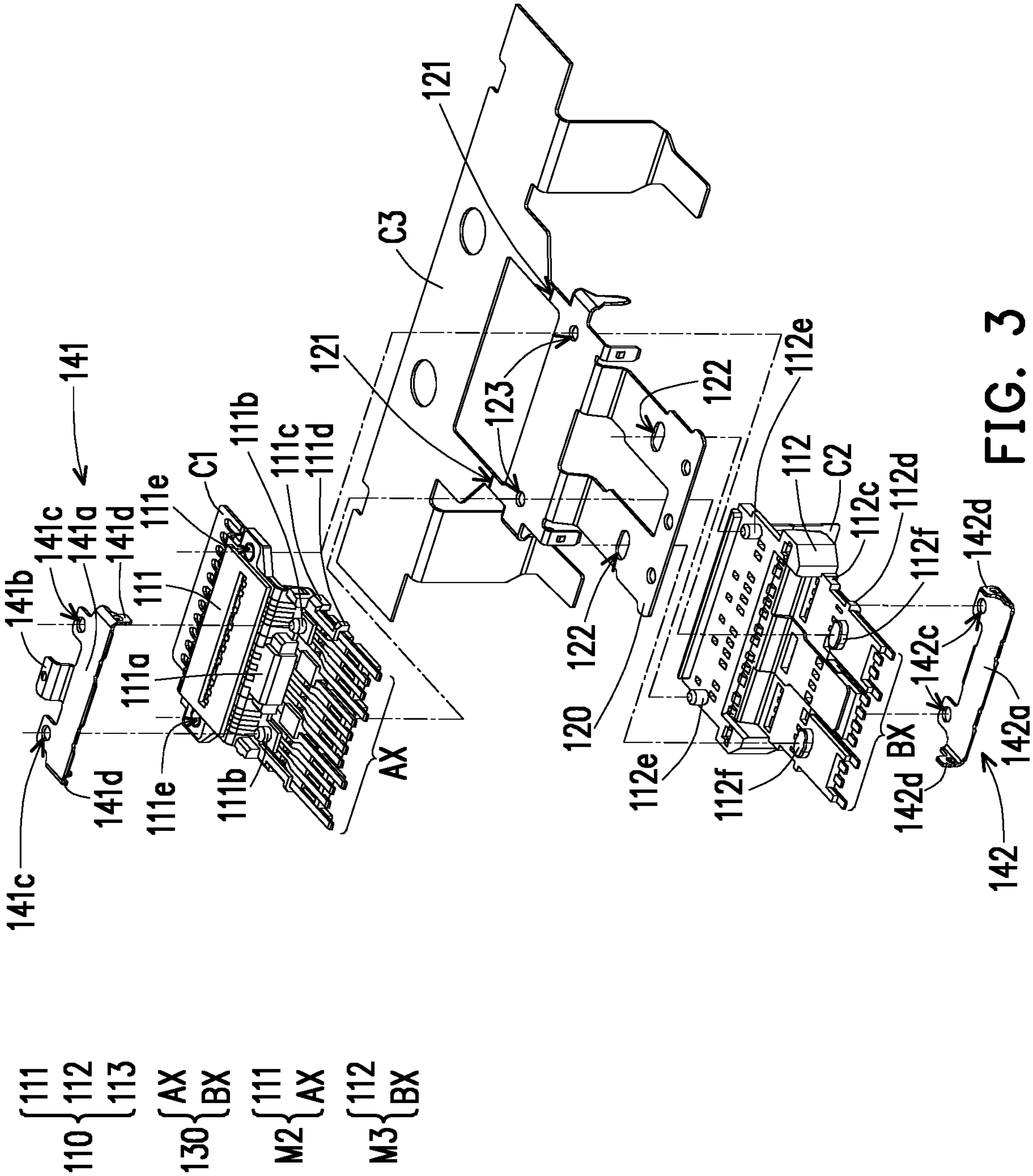
FIG. 3 is a schematic diagram illustrating assembling and combining the electrical connector of FIG. 1.

FIG. 1 is a schematic diagram of an electrical connector according to an embodiment of the disclosure. FIG. 2 is a schematic dissembled diagram of the electrical connector of FIG. 1. FIG. 3 is a schematic diagram illustrating assembling and combining the electrical connector of FIG. 1. Referring to FIG. 1 to FIG. 3 together, in the embodiment, an electrical connector 100 includes an insulating body 110, a first EMI (Electromagnetic Interference) metallic member 141, a second EMI metallic member 142, multiple terminals 130, and a metallic shell 150. The insulating body 110 is divided into a base portion T1, a thickened step portion T2, and a tongue portion T3. The terminals 130 are disposed in the insulating body 110, and portions of the terminals 130 exposed out from the tongue portion T3 are provided for the electrical connector 100 to abut against multiple terminals (not shown) of another electrical connector (not shown) when the electrical connector 100 is connected to the other electrical connector (not shown). The metallic shell 150 is disposed on an exterior of the insulating body 110 to surround the first EMI metallic member 141, the second EMI metallic member 142, and the terminals 130. The metallic shell 150 includes an internal metallic shell 151 and an external metallic shell 152 overlapped with each other to form an insertion opening 153. Hence, the electrical connector 100 may be connected to the other electrical connector along a connecting axis D1 through the insertion opening 153.

As shown in FIG. 1, the electrical connector 100 of the disclosure is, for example, a receptacle electrical connector configured on a circuit board (not shown) and fixed on the circuit board though a side wing 152*a* folded from the metallic shell 150. In addition, as shown in FIG. 2, the base portion T1, the thickened step portion T2, and the tongue portion T3 may be sequentially presented as a staircase structure with a thickness that is gradually decreased. Referring to FIG. 1 together, it is obviously obtained that a distance of the tongue portion T3 relative to the insertion opening 153 is less than a distance of the thickened step portion T2 relative to the insertion opening 153, and the distance of the thickened step portion T2 relative to the insertion opening 153 is less than a distance of the base portion T1 relative to the insertion opening 153.

Figure 4:
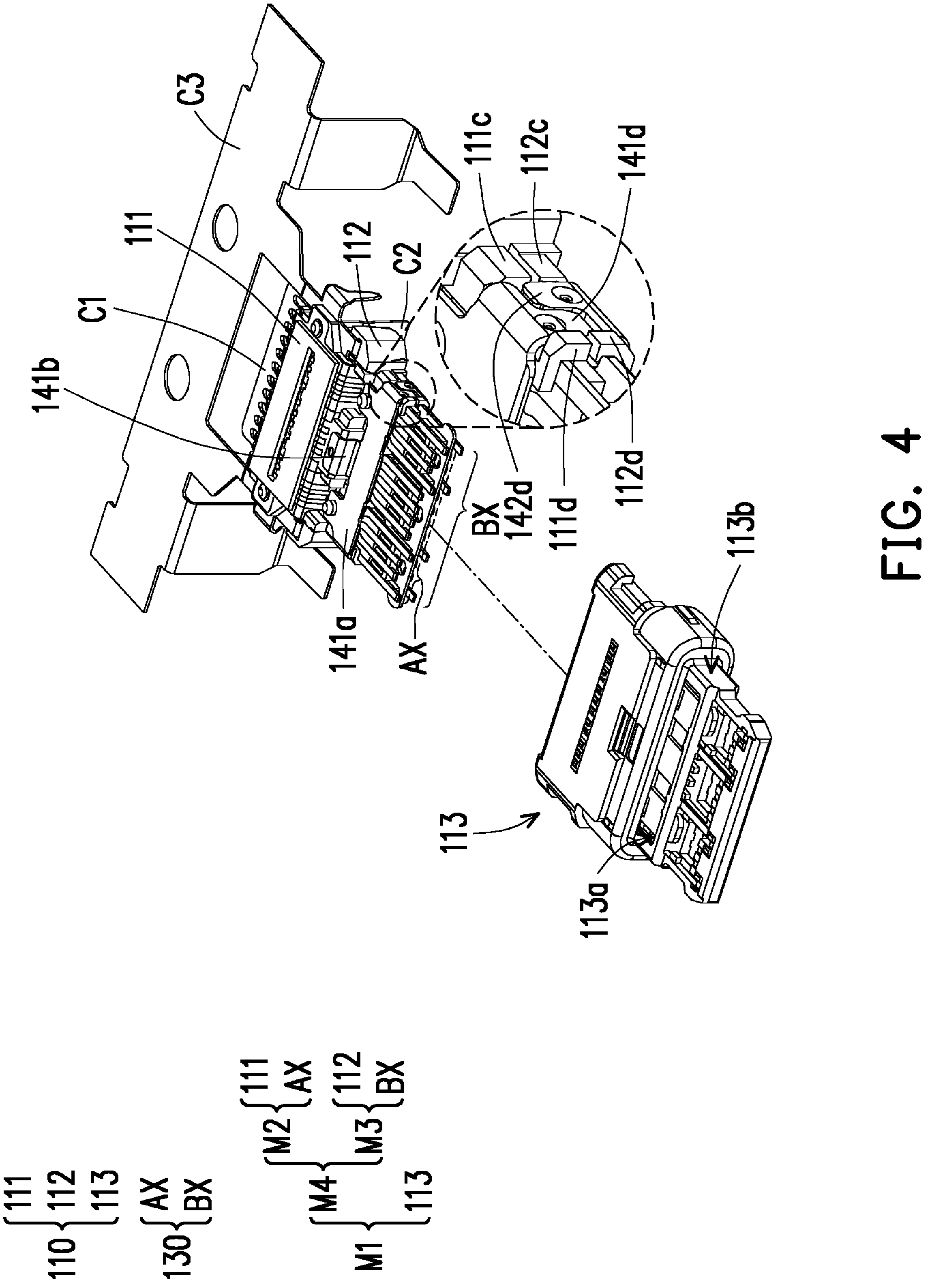
FIG. 4 is a schematic diagram illustrating assembling and combining the electrical connector of FIG. 1.
Figure 5:
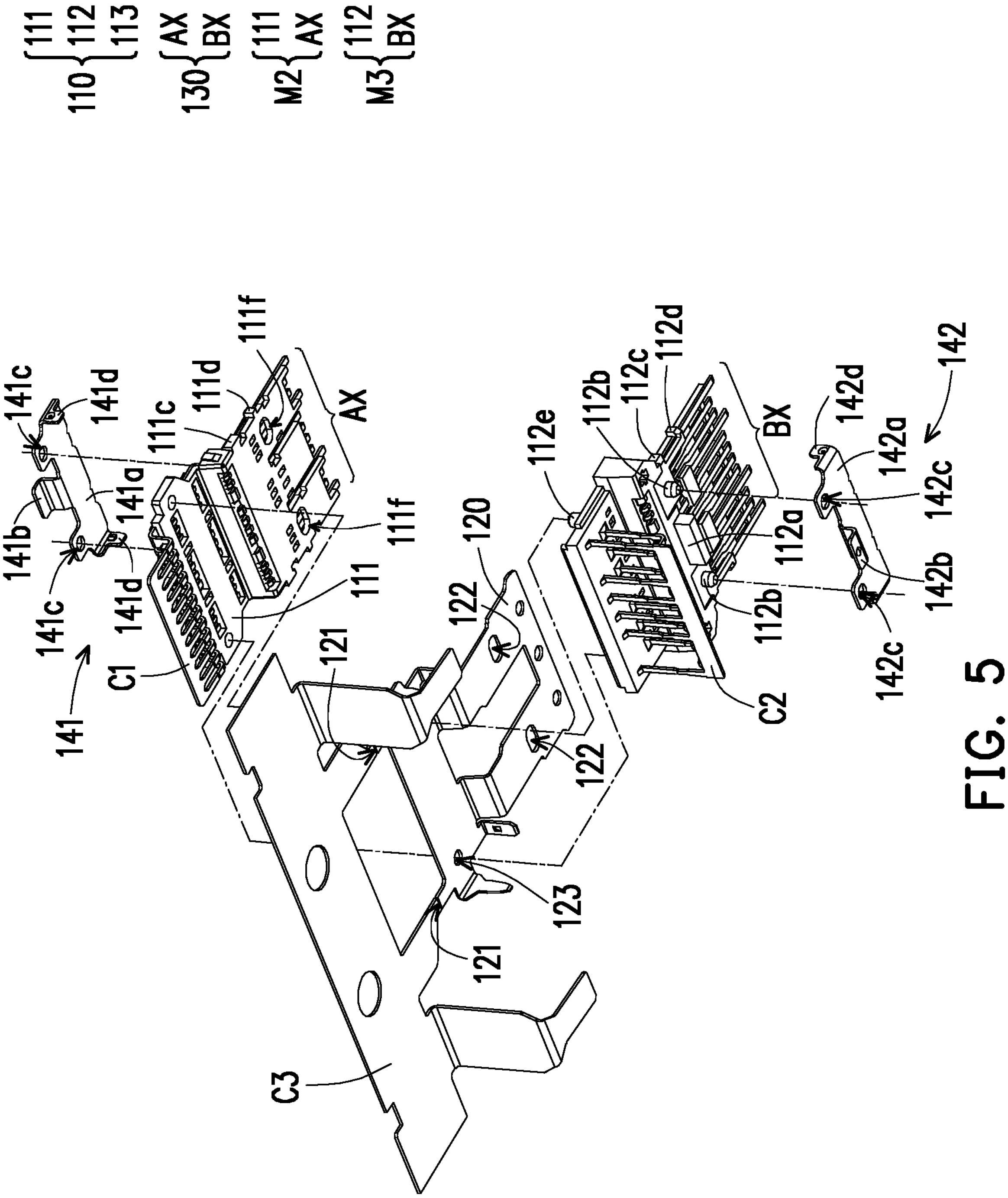
FIG. 5 is a schematic diagram of the electrical connector of FIG. 3 from another perspective.
Figure 6:
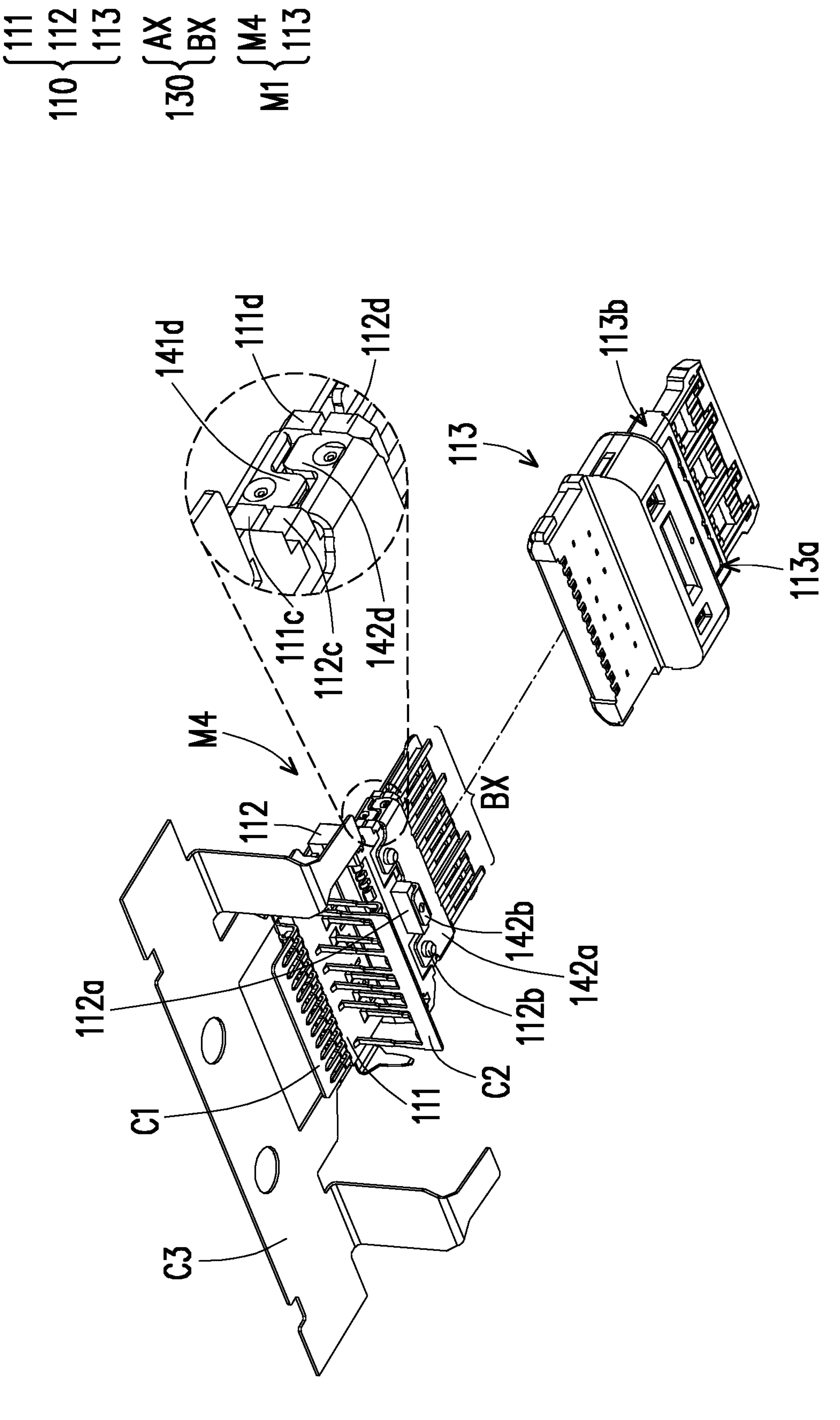
FIG. 6 is a schematic diagram of the electrical connector of FIG. 4 from another perspective.

FIG. 4 is a schematic diagram illustrating assembling and combining the electrical connector of FIG. 1. FIG. 5 is a schematic diagram of the electrical connector of FIG. 3 from another perspective. FIG. 6 is a schematic diagram of the electrical connector of FIG. 4 from another perspective. Element features and an assembling (combination) process are described altogether below. Referring to FIG. 2, FIG. 3, and FIG. 5 first, in the embodiment, the electrical connector 100 further includes a third EMI metallic member 120. The insulating body 110 includes a first structure member 111 and a second structure member 112. The terminals 130 are divided into two terminal sets AX and BX to form main combination elements in a manufacturing process shown in FIG. 3 and FIG. 5 with the first EMI metallic member 141 and the second EMI metallic member 142.

First, the terminal sets AX and BX are respectively formed with a conductive metallic plate through stamping and bending. As shown in FIG. 3 and FIG. 5, the terminal set AX and a connection strip C1 are still connected, and the terminal set BX and a connection strip C2 are still connected. Next, the first structure member 111 is formed on the terminal set AX through insert molding process and then the first structure member 111 and the terminal set AX are combined to form an assembly M2, and the second structure member 112 is formed on the terminal set BX through insert molding process and then the second structure member 112 and the terminal set BX are combined to form an assembly M3. At the same time, the first EMI metallic member 141, the second EMI metallic member 142, and the third EMI metallic member 120 are respectively formed with a conductive metallic plate through stamping and bending. The third EMI metallic member 120 is similar to the terminal sets AX and BX, which means that the third EMI metallic member 120 and a connection strip C3 are still connected through a connection strip 121.

Next, the components are assembled according to the assembling lines shown in FIG. 3 and FIG. 5, the first EMI metallic member 141 and the second EMI metallic member 142 respectively correspond to the two terminal sets AX and BX disposed up and down on, and the first structure member 111 and the second structure member 112 of the insulating body 110 are also disposed up and down. Here, the first EMI metallic member 141 and the second EMI metallic member 142 respectively have a main board 141*a* and a main board 142*a*, a pair of wing portions 141*d* and a pair of wing portions 142*d*, and a leaning portion 141*b* and a leaning portion 142*b*. The wing portions 141*d* and the pair of wing portions 142*d* respectively extend from the main board 141*a* and the main board 142*a* and are located at two opposite sides of the main board. The leaning portion 141*b* and the leaning portion 142*b* extend out from a center part of the main board 141*a* and a center part of the main board 142*a* and form a staircase shape with the main board 141*a* and the main board 142*a*.

The first EMI metallic member 141 and the second EMI metallic member 142 respectively further have multiple openings 141*c* and 142*c* located at the main board 141*a* and the main board 142*a*, and the insulating body 110 further has multiple protruding pillars (e.g. protruding pillars 111*b* located on the first structure member 111 and protruding pillars 112*b* located on the second structure member 112) and pass through the openings 141*c* and 142*c* through the protruding pillars 111*b* and 112*b* so that the first EMI metallic member 141 and the second EMI metallic member 142 are disposed up and down and correspondingly assembled on the first structure member 111 and the second structure member 112 of the insulating body 110.

Furthermore, the insulating body 110 further has multiple protruding blocks (e.g. a protruding block 111*a* located on the first structure member 111 and a protruding block 112*a* located on the second structure member 112) disposed up and down. Hence, when the first EMI metallic member 141 and the second EMI metallic member 142 are correspondingly assembled on the first structure member 111 and the second structure member 112, the leaning portion 141*b* of the first EMI metallic member 141 and the leaning portion 142*b* of the second EMI metallic member 142 respectively abut against the protruding block 111*a* and the protruding block 112*a*.

In addition, the third EMI metallic member 120 further has multiple openings 123 and 122. The first structure member 111 further has combining holes 111*e* and 111*f*, and the second structure member 112 has protruding pillars 112*e* and 112*f*. The protruding pillars 112*e* and 112*f* are assembled into the combining holes 111*e* and 111*f* through the openings 123 and 122 to complete an assembling process of the first structure member 111, the third EMI metallic member 120, and the second structure member 112. That is, the third EMI metallic member 120 is assembled and clamped between the two assemblies M2 and M3 to be a mid-plate between the two assemblies M2 and M3.

Note that as shown in FIG. 3 and FIG. 5, only an assembling relationship of the first EMI metallic member 141, the assembly M2, the third EMI metallic member 120, the assembly M3, and the second EMI metallic member 142 is illustrated in the embodiment; however, the disclosure is not intended to limit an assembling order thereof. The assembling order thereof may be adjusted properly according to efficiency requirements.

Referring to FIG. 3 and FIG. 4, it is worth mentioning that the insulating body 110 further has multiple position-limiting structures including protruding blocks 111*c* and 111*d* located at two opposite sides of the first structure member 111 and protruding blocks 112*c* and 112*d* located at two opposite sides of the second structure member 112. Here, the sides refer to the opposite two sides separated with respect to the connecting axis D1 shown in FIG. 1. As shown in FIG. 4, the protruding blocks 111*c* and 111*d* and the protruding blocks 112*c* and 112*d* located at the same side form the position-limiting structure so that the wing portion 141*d* of the first EMI metallic member 141 and the wing portion 142*d* of the second EMI metallic member 142 at the same side are fixed in a recess structure formed by the protruding blocks 111*c*, 111*d*, 112*c*, and 112*d* and positions of the wing portion 141*d* of the first EMI metallic member 141 and the wing portion 142*d* of the second EMI metallic member 142 at the same side are limited by the protruding blocks 111*c*, 111*d*, 112*c*, and 112*d*. Corresponding to the insulating body 110 as shown in FIG. 2, the position-limiting structures and the wing portions 141*d* and 142*d* of the first EMI metallic member 141 and the second EMI metallic member 142 are substantially respectively located at two opposite sides of the thickened step portion T2, and the wing portions 141*d* of the first EMI metallic member 141 and the wing portions 142*d* of the second EMI metallic member 142 are disposed front and back and alternately abut against each other along the connecting axis D1 of the electrical connector 100 and outlines of the wing portions 141*d* and 142*d* complement each other. That is, in a side view, the wing portions 141*d* and 142*d* are respectively presented as a shape of L and a shape of L that is upside down, and the outlines thereof complement each other to form a rectangle.

In this way, the components that are assembled above may be viewed as the following. The third EMI metallic member 120 is disposed in the insulating body 110 to divide the terminals 130 into the two terminal sets AX and BX disposed up and down. The third EMI metallic member 120 is located between the first EMI metallic member 141 and the second EMI metallic member 142 so that the first EMI metallic member 141 and the second EMI metallic member 142 respectively correspond to configuration states of the two terminal sets AX and BX. In short, in the process above, it is equivalent to that the assemblies M2 and M3 and the third EMI metallic member 120 form another assembly M4.

Next, referring to FIG. 4 and FIG. 6, the insulating body 110 of the embodiment further includes a third structure member 113. After the assemblies M2 and M3, the first EMI metallic member 141, the second EMI metallic member 142, and the third EMI metallic member 120 are assembled and form the assembly M4, the third structure member 113 is combined with and encapsulates an exterior of the two assemblies M2 and M3, the first EMI metallic member 141, the second EMI metallic member 142, and the third EMI metallic member 120 (equivalent to the assembly M4) through insert molding to form an assembly M1. As shown in FIG. 2, a manufacturing process of the electrical connector 100 is completed only after the internal metallic shell 151 and the external metallic shell 152 of the metallic shell 150 are sequentially connected.

In addition, as shown in FIG. 4 and FIG. 6, with respect to the position-limiting structures and the wing portions 141*d* and 142*d*, portions of a structure 113*b* of the third structure member 113 located at the two opposite sides may cover the protruding blocks 111*c*, 111*d*, 112*c*, and 112*d* and the wing portions 141*d* and 142*d*. At the same time, the third structure member 113 further has a pair of openings 113*a* to respectively expose the portion of the first EMI metallic member 141 and the portion of the second EMI metallic member 142. Here, the exposed portions are substantially a portion of the main board 141*a* of the first EMI metallic member 141 and a portion of the main board 142*a* of the second EMI metallic member 142. Corresponding to FIG. 2, it is equivalent to that the portion of the main board 141*a* of the first EMI metallic member 141 and the portion of the main board 142*a* of the second EMI metallic member 142 are exposed out of the insulating body 110 from the thickened step portion T2.

Similarly, the third structure member 113 in FIG. 3 and FIG. 4 are formed through insert molding on an outer surface of the first EMI metallic member 141, the first structure member 111, the third EMI metallic member 120, the second structure member 112, and the second EMI metallic member 142 that are assembled. Hence, separated structures shown in FIG. 3 and FIG. 4 are only schematic rather than structures of the assembling process.

Figure 7:
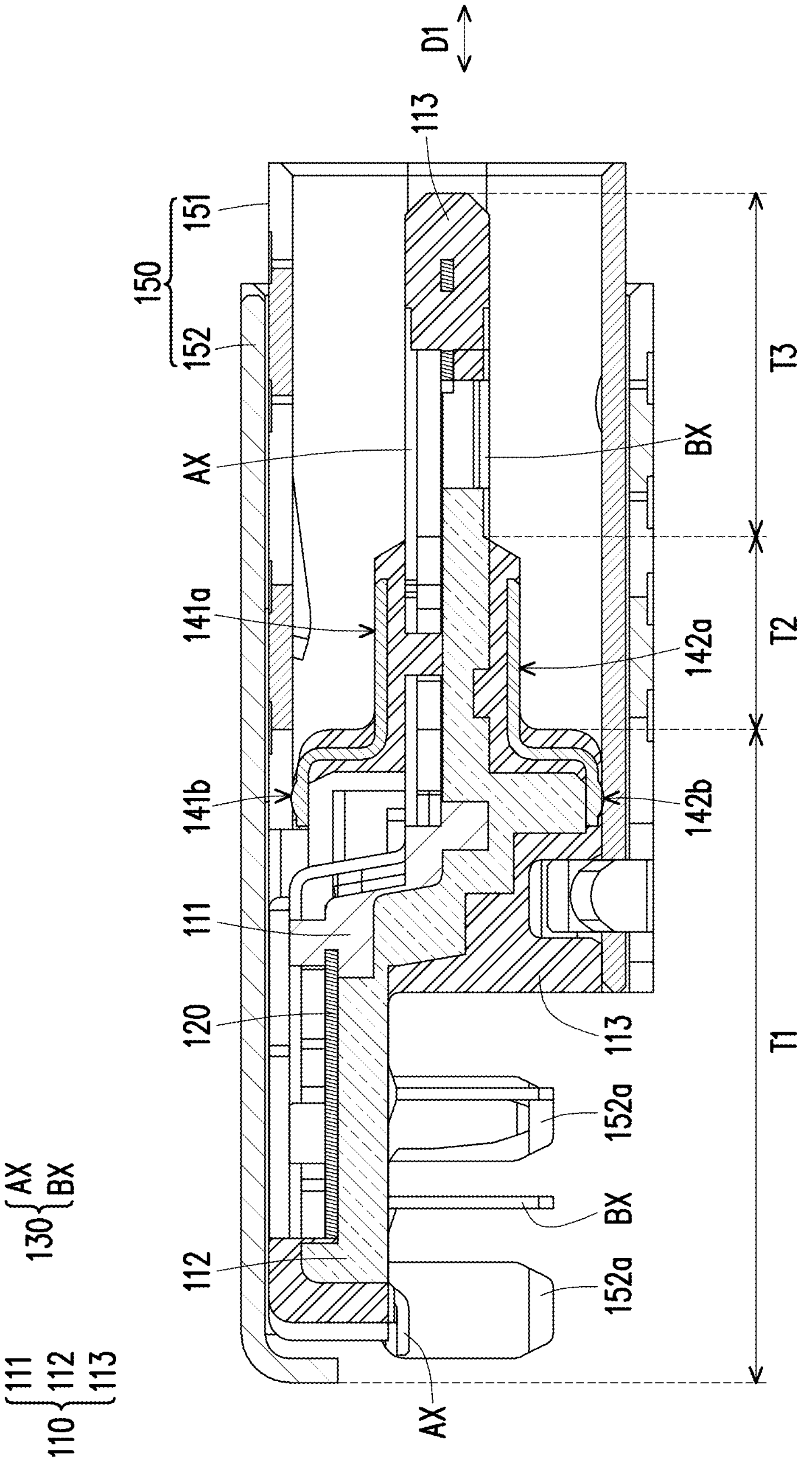
FIG. 7 is a schematic cross-sectional diagram of the electrical connector of FIG. 1.

FIG. 7 is a schematic cross-sectional diagram of the electrical connector of FIG. 1, and it is a schematic diagram of the electrical connector 100 substantially viewed along a plane where the connecting axis D1 is located. Referring to FIG. 7, the relevant components of the electrical connector 100 are described above. It is worth mentioning that after the first EMI metallic member 141 and the second EMI metallic member 142 are assembled according to the process of FIG. 3 (or FIG. 5), the first EMI metallic member 141 and the second EMI metallic member 142 respectively extend from the base portion T1 to the thickened step portion T2, and the exposed portions of the first EMI metallic member 141 and the second EMI metallic member 142 from the thickened step portion T2 are configured to abut against a metallic shell of the other electrical connector to achieve the required grounding or electromagnetic shielding effect.

In summary of the above, in the embodiments of the disclosure, the insulating body of the electrical connector is divided into the base portion, the tongue portion, and the thickened step portion between the base portion and the tongue portion. The first EMI metallic member and the second EMI metallic member are disposed in the insulating body and the portions of the first EMI metallic member and the second EMI metallic member are respectively exposed out of the insulating body from the thickened step portion. Accordingly, in the disclosure, by inserting the portions the two EMI metallic members into the insulating body, when a connection of the electrical connector and the other electrical connector is maintained, the portions exposed out of the insulating body still may achieve shielding or grounding with the other electrical connector. A conventional manufacturing process of an electrical connector where a molding process precedes an assembling process may be prevented, thereby avoiding difficulties in assembling due to component miniaturization. Furthermore, the entire structural strength of the insulating body may be enhanced.

What is claimed is:

1. An electrical connector comprising:

an insulating body comprising a base portion, a thickened step portion, and a tongue portion, wherein the thickened step portion is located at a root of the tongue portion;

a first metallic member and a second metallic member respectively disposed on an upper surface and a lower surface of the insulating body;

a plurality of terminals categorized into two terminal sets, wherein front flat contact portions of the two terminal sets are respectively disposed on an upper surface and a lower surface of the tongue portion;

a metallic shell is disposed on an exterior of the insulating body to surround the first metallic member, the second metallic member, and each of the terminals, wherein the front flat contact portion of each of the terminals is exposed out of the tongue portion, and a portion of the first metallic member and a portion of the second metallic member are exposed out of the thickened step portion; and a third metallic member, wherein the third metallic member is disposed in the insulating body to divide all the terminals into two terminal sets disposed up and down, the third metallic member is located between the first metallic member and the second metallic member so that the first metallic member and the second metallic member respectively correspond to the two terminal sets, wherein the insulating body comprises a first structure member and a second structure member to be correspondingly combined with the two terminal sets and form two assemblies through insert molding, the first metallic member, the second metallic member, and the two assemblies are correspondingly assembled, and the third metallic member is disposed between the two assemblies, wherein the insulating body further comprises a third structure member, after the two assemblies, the first metallic member, the second metallic member, and the third metallic member are assembled, the third structure member is combined with and encapsulates an exterior of the two assemblies, the first metallic member, the second metallic member, and the third metallic member through insert molding.

2. The electrical connector according to claim 1, wherein the first metallic member and the second metallic member respectively extend from the base portion to the thickened step portion.

3. The electrical connector according to claim 1, wherein the first metallic member and the second metallic member respectively have a main board, a pair of wing portions, and a leaning portion, the wing portions respectively extend from the main board and are located at two opposite sides of the main board, the leaning portion extends out from a center part of the main board, and a portion of the main board is exposed from the thickened step portion.

4. The electrical connector according to claim 3, wherein at a same side of the first metallic member and a same side of the second metallic member, the wing portions of the first metallic member and the wing portions of the second metallic member are disposed front and back and alternately abut against each other along a connecting axis of the electrical connector.

5. The electrical connector according to claim 4, wherein outlines of the wing portions disposed front and back and alternately abutting against each other complement each other.

6. The electrical connector according to claim 3, wherein the insulating body further has a plurality of position-limiting structures respectively located at two opposite sides of the thickened step portion, and each of the position-limiting structures limits positions of the wing portions disposed front and back and alternately abutting against each other.

7. The electrical connector according to claim 3, wherein the first metallic member and the second metallic member respectively further have a plurality of openings located on the main board, and the insulating body further has a plurality of protruding pillars that pass through each of the openings so that the first metallic member and the second metallic member are disposed up and down in the insulating body.

8. The electrical connector according to claim 3, wherein the insulating body has a plurality of protruding blocks disposed up and down, and the leaning portion of the first metallic member and the leaning portion of the second metallic member respectively abut against each of the protruding blocks.

9. The electrical connector according to claim 1, wherein the first structure member and the second structure member respectively have a plurality of protruding blocks located at two opposite sides, after the two assemblies and the third metallic member are assembled, the protruding blocks located at the same side form a recess to limit positions of a portion of the first metallic member and a portion of the second metallic member.

10. The electrical connector according to claim 9, wherein the first metallic member and the second metallic member respectively have a pair of wing portions respectively located at the two opposite sides, positions of the two wing portions at the same side are limited in the recess, and portions of a structure of the third structure member located at the two opposite sides cover each of the protruding blocks and each of the wing portions.

11. The electrical connector according to claim 1, wherein the third structure member has a pair of openings to respectively expose the portion of the first metallic member and the portion of the second metallic member.

12. An electrical connector comprising an insulating body, wherein the insulating body has a base portion, a thickened step portion, and a tongue portion, wherein the thickened step portion is located at a root of the tongue portion;

a first metallic member and a second metallic member are respectively disposed on an upper surface and a lower surface of the thickened step portion;

a plurality of terminals categorized into two terminal sets, wherein front flat contact portions of the two terminal sets are respectively disposed on an upper surface and a lower surface of the tongue portion;

a mid-plate disposed inside the insulating body and located between the two terminal sets, wherein the mid-plate is located between the first metallic member and the second metallic member; and a metallic shell is disposed on an exterior of the insulating body to surround the first metallic member, the second metallic member, and the two terminal sets, wherein the insulating body comprises a first structure member, a second structure member and a third structure member, wherein the first structure member and the second structure member are respectively combined with the two terminal sets through insert molding to form two assemblies; after the two assemblies, the first metallic member, the second metallic member, and the mid-plate are correspondingly assembled, the mid-plate is disposed between the two assemblies, and the third structure member is combined with and encapsulates an exterior of the two assemblies, the first metallic member, the second metallic member, and the mid-plate through insert molding to form the insulating body such that the front flat contact portion of each of the terminals is exposed out of the tongue portion, and a portion of the first metallic member and a portion of the second metallic member are exposed out of the thickened step portion.

13. The electrical connector according to claim 12, wherein the first metallic member and the second metallic member respectively extend from the base portion to the thickened step portion.

14. The electrical connector according to claim 12, wherein the first metallic member and the second metallic member respectively have a main board, a pair of wing portions, and a leaning portion, the wing portions respectively extend from the main board and are located at two opposite sides of the main board, the leaning portion extends out from a center part of the main board, and a portion of the main board is exposed from the thickened step portion.

15. The electrical connector according to claim 14, wherein at a same side of the first metallic member and a same side of the second metallic member, the wing portions of the first metallic member and the wing portions of the second metallic member are disposed front and back and alternately abut against each other along a connecting axis of the electrical connector.

16. The electrical connector according to claim 15, wherein outlines of the wing portions disposed front and back and alternately abutting against each other complement each other.

17. The electrical connector according to claim 14, wherein the insulating body further has a plurality of position-limiting structures respectively located at two opposite sides of the thickened step portion, and each of the position-limiting structures limits positions of the wing portions disposed front and back and alternately abutting against each other.

* * * * *